United States Patent [19]

Kitajima et al.

[11] Patent Number: 4,463,083

[45] Date of Patent: * Jul. 31, 1984

[54] THERMAL RECORDING ELEMENTS

[75] Inventors: Masao Kitajima; Osamu Seshimoto, both of Asaka; Tomizo Namiki; Fumiaki Shinozaki, both of Fujinomiya; Tomoaki Ikeda, Tokyo; Yuzo Mizobuchi, Miyanodai, all of Japan

[73] Assignee: Fuji Photo Film Co., Ltd., Kanagawa, Japan

[*] Notice: The portion of the term of this patent subsequent to Aug. 4, 1998 has been disclaimed.

[21] Appl. No.: 377,100

[22] Filed: May 11, 1982

Related U.S. Application Data

[63] Continuation of Ser. No. 52,153, Jun. 26, 1979, abandoned.

[30] Foreign Application Priority Data

Jun. 29, 1978 [JP] Japan .................................. 53-79072

[51] Int. Cl.³ .................... G03C 1/74; G01D 15/34
[52] U.S. Cl. ................................... 430/273; 430/290; 430/321; 430/330; 430/348; 430/496; 430/534; 430/535; 430/945; 430/950; 430/961; 430/964; 346/76 L; 346/76 R; 346/77 R; 346/77 E; 346/135.1

[58] Field of Search .............. 430/534, 535, 496, 945, 430/961, 950, 290, 273, 321, 964, 330, 348; 346/76 L, 76 R, 77 R, 77 E, 135.1

[56] References Cited

U.S. PATENT DOCUMENTS

| | | | |
|---|---|---|---|
| 4,069,487 | 1/1978 | Kasai et al. | 346/76 L |
| 4,101,907 | 7/1978 | Bell et al. | 346/76 L |
| 4,112,013 | 9/1978 | Briggs et al. | 156/333 |
| 4,170,683 | 10/1979 | Miklos | 428/336 |
| 4,237,468 | 12/1980 | Nahara et al. | 346/135.1 |
| 4,268,575 | 5/1981 | Shinozaki et al. | 346/76 L |
| 4,282,534 | 8/1981 | Shinozaki et al. | 346/135.1 |
| 4,309,713 | 1/1982 | Shinozaki et al. | 346/76 R |

OTHER PUBLICATIONS

Castrignano, R. A., *J. of Applied Photographic Engineering*, vol. 4, No. 1, 1978, pp. 1-8.

*Primary Examiner*—Charles L. Bowers, Jr.
*Attorney, Agent, or Firm*—Sughrue, Mion, Zinn, Macpeak & Seas

[57] ABSTRACT

A thermal recording element comprising a support having formed thereon a recording layer, a first protective layer comprising an organic high molecular weight material having a softening point below about 70° C. formed on the recording layer, and a second protective layer comprising an organic high molecular weight material having high mechanical strength.

12 Claims, No Drawings

THERMAL RECORDING ELEMENTS

This is a continuation of application Ser. No. 52,153, filed June 26, 1979, abandoned.

BACKGROUND OF THE INVENTION

1. Field of the Invention

This invention relates to a thermal recording element for recording information by thermally deforming a recording layer using a high intensity radiation and recording information by the change in the light transmitting and reflecting properties of the layer. More particularly, the invention relates to a thermal recording element having protective layers having high mechanical strength and exhibiting reduced reduction in recording sensitivity.

2. Description of the Prior Art

When a recording layer having high optical density is irradiated by a high intensity radiation such as a laser beam in accordance with information, the recording layer by absorbing the high energy density light beam thus irradiated undergoes local temperature increases producing physical changes such as fusion, evaporation, aggregation, etc., whereby information is recorded by the formation of a difference in optical density between the irradiated portions and non-irradiated portions. Such a thermal recording element has the advantages that processing such as development, fixing, etc., are unnecessary, a dark room is unnecessary since the recording element is not sensitive to ordinary room light, high contrast images are obtained, and addition recording (add on) of information is possible.

Recording on such a thermal recording element is generally performed by converting recording information to an electric time-succession signal and scanning the recording element by a laser beam the intensity of which is modulated according to the electric signal. In this case, there is also the advantage that the recorded image is obtained in real time.

Such recording elements are described in, for example, M. L. Levene, et al, *Electron, Ion and Laser Beam Technology* (the record of the 11th Symposium held in 1969; "Elctronics", page 50 (March 18, 1968); D. Maydan, *The Bell System Technical Journal*, Vol. 50, 1761 (1971); C. O. Carlson, *Science*, Vol. 154, 1550 (1966), etc. As the recording layer for the thermal recording elements, metals, dyes, plastics, etc., are suitable. In particular, as a metal recording layer, there is a thermal recording element comprising a support having formed thereon a thin layer of a metal such as Bi, Sn, In, etc., and such a recording element has excellent properties as a thermal recording element such that images of high resolving power and high contrast can be recorded.

However, the recording element containing a thin metal recording layer generally shows light reflectance of higher than 50% to the laser light used for recording, which makes it impossible to utilize effectively the energy of the laser beam and hence power of the laser light used for recording must be higher which requires a laser light source of high output for recording at high scanning speed, and thus the recording apparatus used becomes larger and more expensive.

Therefore, various recording elements having high recording sensitivity have been investigated and as an example, a recording element wherein a very thin layer of Ge is superposed on a thin layer of Se and Bi for reducing the light reflectance is described in U.S. Pat. No. 3,560,994. However, the use of Se, etc., is undesirable since there is a possiblity of toxicity problems and the images recorded are not satisfactory.

As other examples of a recording element having a reflection preventing layer, a recording element having a metal layer and a reflection preventing layer absorbing light in the wave length region of the laser light used for recording is disclosed in the specifications of Japanese Patent Application (OPI) Nos. 151,151/'75 and 74,632/'76. Also, a recording element having a recording layer composed of a physical mixture of a metal and a reflection preventing material is disclosed in Japanese Patent Application (OPI) No. 78,236/'76. However, the recording layer of such a thermal recording element is generally very liable to be scratched and since the thickness of the recording layer is at most about 0.5 $\mu$m, the scratches formed on the surface of the recording layer during handling the recording element reach the surface of the support and they can appear upon reading the recorded information, which results in a loss in the reliability of the recorded information. Furthermore, in such thermal recording elements it is very difficult to select a thermal recording element having sufficient sensitivity, high mechanical strenght, and sufficient adaptability for practical use and further it is difficult to provide such recording elements commercially at a low cost.

Hitherto, to overcome the scratching difficulty, it is know to form a protective layer on the recording layer and recording elements having a protective layer of an organic high molecular weight material or polymer on the recording layer are disclosed in Japanese Patent Application (OPI) Nos. 96,716/'74, 59,626/'76, 75,523/'76 and 88,024/'76. However, when the thickness of the protective layer composed of such an organic high molecular weight material or polymer is sufficiently increased to prevent the recording layer from being scratched, for example, made thickener than 3 $\mu$m, the sensitivity of the recording element is reduced greatly, (e.g., to ½ or ⅓ of the original sensitivity) which makes the recording element impractical.

SUMMARY OF THE INVENTION

An object of this invention is, therefore, to provide a thermal recording element which can provide a large number of reproductions by contact print without reducing the sensitivity of the recording layer and without scratching.

Another object of this invention is to provide a thermal recording element capable of easily removing dust attached to the recording elements without scratching the recording layer thereof.

Accordingly this invention provides a thermal recording element comprising a support having formed thereon directly or indirectly a recording layer, a first protective layer comprising an organic high molecular weight material or polymer having a softening point of lower than about 70° C. formed on the recording layer, and a second protective layer comprising a high molecular weight material or polymer having high mechanical strength formed on the first protective layer.

DESCRIPTIN OF THE PREFERRED EMBODIMENTS

As the support used in this invention, any support generally used in this type of recording element can be used. For example, plastics such as polyethylene terephthalate, polycarbonate, etc., glass sheets, papers, metallic sheets or foils, etc. can be used, but polyethylene terephthalate film is particularly preferred since the film is light in weight and tough, exhibits low elongation and, if desired, a very thin film can be formed therefrom, and the film is transparent.

The recording layer used in this invention is a layer having a high optical density and is preferably composed of a material having a high covering power when formed into a thin layer. The recording layer used in this invention includes not only a layer of a material having a high covering power in thin layer (e.g., a metal layer) but also a recording layer unit comprising a metal layer and a layer composed of anoher material for increasing recording sensitivity superposed on the metal layer, and also a layer of a mixture of a metal and another material for increasing the recording sensitivity. The recording layer is the layer primarily responsible for the change in the optical transmission of light as a result of thermal deformation such as fusion, evaporation, aggregation, etc., at the irradiated portions by the irradiation of laser light and for the purpose various layer structures and materials can be selected as will be recognized by the skilled artisan.

As the metals used for the recording layer in this invention, there are Mg, Sc, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, As, Sb, Bi, Se, Te, etc., and they may be used along or in combinations of two or more. Preferably the metal used in this invention has little or no toxicity, requires low enegy for fusing or evaporating, and can easily form a film or layer. The most preferred metals used in this invention are Sn, Bi and In.

The thin layer of the metals can be formed in a single layer or double layers on a support or a substrate or other layer formed on the support by various methods such as vacuum deposition, sputtering, ion plating, electroplating, electrolessplating, etc., as a single metal or as a combination or alloy of two or more metals. Furthermore, the metal may be applied as a layer wherein the metal and a material for increasing the sensitivity exist in a physically mixed state by means of co-deposition of the metal and the material.

The thickness of the metal layer is such that the optical density necessary for forming the image is obtained and, for example, is generally required to be 300 to 1,500 Å depending upon the metal used. Also, in the case of forming the metal layer on a support by vacuum deposition, sputtering, ion plating, etc., the layer structure of the metal layer differs with the kind of the support, temperature, the degree of the vacuum, the speed of vacuum deposition, etc., and hence the thickness of the metal layer necessary for obtaining a desired optical density depends on these factors as well.

It is preferred that the metal is used together with a material for increasing the recording sensitivity as a mixture or as a laminate of layers. The material used for increasing the recording sensitivity exhibits a reflection preventing action or other actions. For example, there are oxides such as $PbO$, $WO_3$, $TiO_2$, $SiO$, $SiO_2$, $ZrO_2$, etc.; chalcogen compounds of Ge, In, Sn, Cu, Ag, Fe, Bi, Al, Si, Zn, V, etc.; halides such as $PbX_2$, $AgX$, $SnX_2$, $SbX_5$, $SbX_3$, etc., (where X is fluorine, chlorine, bromine, iodine, etc.,); and As, Sb, P, Ge, Si, Te, etc. It is preferred that these materials have little or no toxicity, they have less hygroscopicity or deliquescence, show low deterioration with the passage of time as a result of a dark reaction with a metal, and they can form a layer or film thereof easily. For the purpose, the use of GeS, SnS, $PbI_2$, etc., is particularly preferred.

When the material is formed on a metal layer, the thickness of the material depends upon the kind of the metal of the metal layer, the thickness of the metal layer, etc., but is usually about 50 to 1,000 Å.

A substrate or subbing layer may be formed between a support and the recording layer for increasing the recording sensitivity. For example, subbing layers of a halogenated polyolefin, a halogenated polyhydroxystyrene, chlorinated rubber, etc. are effective for increasing the sensitivity of the recording element.

The protective layer used in this invention is composed of a first protective layer comprising an organic high molecular weight material having a low softening point formed on a recording layer and a second protective layer comprising an organic high molecular weight material having high mechanical strength formed on the first protective layer, and further, if necessary, a layer of a higher fatty acid or an amide thereof for improving the slipping property of the surface of the recording element formed on the second protective layer.

The organic high molecular weight material or polymer used in the first protective layer has a softening point lower than about 70° C., preferably lower than about 60° C., and most preferably lower than about 50° C. The term "softening point" as used in this specification means the temperature as determined for the softening point of a plastic material by a Vicat test and is pratically the temperature measured by the test method of ASTM D1525.

As a result of investigating on high molecular weight materials having various softening points used for the first protective layer, the inventors have found that when an organic high molecular weight material having a softening point of lower than about 70° C., particularly lower than about 50° C., is used as the first protective layer, the recording sensitivity of the recording element becomes higher or twice the sensitivity of the recording element using a polymer having a softening point of higher than above 80° C. as the first protective layer.

Examples of the organic high molecular weight materials or polymers having a softening point of lower than about 70° C. are an ethylene-vinyl acetate copolymer containing higher than about 10 wt % vinyl acetate, polychloroprene, polychlorosulfonated polyethylene, etc. Furthermore, the organic high molecular weight materials having softening points lower than about 70° C., by Vicat test as described in *Plastic Property Handbook* (edited by Nippon Plastic Industry Leaque and All Japan Plastic Molding Industry Association, published on Oct. 25, 1968 by Kogyo Chosa Kaj) can be used for the purpose. In addition, some of the materials shown in the above reference having high crystallinity have a softening point higher than 70° C. but the materials having a softening point of higher than 70° C. are unsuitable as the first protective layer in this invention.

The materials forming the first protective layer are usually rubber-like materials and since they are usually sticky, exhibit poor film-forming property, and are liable to be scratched, they cannot achieve various functions as protective layer when used alone even if the thickness of the layer is increased. When a second protective layer as will be described later is formed on the first protective layer, the first proective layer having a thickness of thicker than about 1 μm has the effect of preventing a reduction in recording sensitivity. Generally the thickness of the first protective layer is 1 to 10 μm, preferably 2 to 6 μm.

As the organic high molecular weight materials or polymers for the second protective layer, various materials having high mechanical strength can be used. Examples of these materials are a copolymer of vinyl chloride and vinyl acetate, polyvinyl chloride, acetyl cellulose, polyethylene terephthalate, polyimide, polyurethane, polyvinylidene fluoride, polyvinyl butyral, polyvinyl formal, polyvinyl alcohol, polyvinylidene chloride, polyethylene, polyvinyl pyrrolidone, polyvinyl acrylamide, nylon, polycarbonate, polypropylene, polystyrene, polybutene, polyethylene trifluorochloride, poly(metha)acrylic acid ester, and the copolymers of them. They may be used solely or as a combination of two more such polymers.

The term "material having high mechanical stregnth" means a material which does not easily scratch when the recording element is handled in an ordinary manner. The thickness of the second protective layer may be about 1 to 10 μm, preferably 2 to 6 μm. The thicknesses of the combined protective layes each achieving there respective role is preferred to be less than 10 μm. If the combined thickness of the protective layers is thickner than, for example, 20 μm, the duplicated images become unclear and thus such thickness is undesirable.

In addition, when a layer of a higher fatty acid (e.g., a C12-23 fatty acid) or a higher fatty acid amide is formed on the second protective layer, the surface of the recording element becomes slippery and thus is unlikely to scratch. Such an overcoat layer is preferred and is peferably about 0.05 to 0.5 μm thick.

The preferred properties of protective layers are that they reduce the sensitivity of the recording layer as little as possible, they have high mechanical strength, the first layer adheres sufficiently to the recording layer and is reluctant to separate therefrom, and the thickness of the layers permits clear duplicates of recorded information when the element is used in preparing contact duplicates. The materials used in this invention have the above-mentioned properties.

The invention will be further illustrated by the following examples. Unless otherwise indicate all parts, percents, ratios, etc. are by weight.

EXAMPLE 1-8

On a polyethylene terephthalate film 100 μm thick was coated a solution o 2 g of chlorinated polyethylene ("907 HA", made by Sanyo Kokusaku Pulp Industry K.K.) in a mixed solvent of 50 ml of methylcellosolve acetate and 50 ml of methyl ethyl ketone and dried to form a chlorinated polyethylene layer having dry thickness of 0.3 μm. Then, on the layer were deposited In and GeS in the amounts corresponding to 300 Å thick and 250 Å respectively under the condition of $5 \times 10^{-5}$ Torr to form a recording layer composed of a physical mixture of In and GeS. The recording element thus prepared is referred to as Sample A.

Then, the recording layer was formed as described above and on the recording layer was coated a solution of following Formulation I as a first protective layer to form a layer of an ethylene-vinyl acetate copolymer having a dry thickness of 4 μm.

| Formulation I: | |
| --- | --- |
| Ethylene-vinyl acetate copolymer | 6 g |

| -continued | |
| --- | --- |
| Formulation I: | |
| (ethylene 81 wt. % and vinyl acetate 19 wt. %, "Evaflex #410", made by Mitsui Polychemical Co., Ltd.) | |
| Cyclohexane | 70 ml |
| Toluene | 30 ml |

Then, on the first protective layer was coated the solution of Formulations II-1 to II-8 and dried to form a second protective layer having a dry thickness of 6 μm. That is, the total thickness of the first protective layer and the second protective layer was 10 μm. Thus, 8 additional samples were prepared.

| Formulation II-1: | |
| --- | --- |
| Vinyl chloride-vinyl acetate copolymer (vinyl chloride 85 wt. %, vinyl acetate 15 wt. %, "400 × 150 ML", made by Nippon Zeon Co., Ltd.) | 10 g |
| Acetone | 70 ml |
| Methylcellosolve acetate | 30 ml |
| Formulation II-2: | |
| Alcohol-soluble nylon ("Amilan", made by Toray Co., Ltd.) | 10 g |
| Methanol | 50 ml |
| Isopropyl alcohol | 30 ml |
| n-Butanol | 20 ml |
| Formulation III-3: | |
| Butyral ("S leck BL-2", made by Sekisui Chemical Industry Co., Ltd.) | 6 g |
| Methanol | 50 ml |
| Isopropyl alcohol | 30 ml |
| n-Butyl alcohol | 20 ml |
| Formulation II-4: | |
| Polyurethane emulsion ("Aizelax S-1070", made by Hodogaya Chemical Industry Co., Ltd.) | |
| Formulation II-5: | |
| Vinylidene chloride emulsion ("Kureharon CAT R-104", made by Kureha Chemical Industry Co., Ltd.) | |
| Formulation II-6: | |
| Polyacrylic acid ester emulsion (Primal B-15, made by Nippon Acryl Industry Co., Ltd.) | |
| Formulation II-7: | |
| Ethyl cellulose ("K-80", made by Hercules Powder Co.) | 6 g |
| Methyl ethyl ketone | 50 ml |
| n-Butyl alcohol | 50 ml |
| Formulation II-8: | |
| Polyethylene emulsion ("Chemipal A 100", made by Mitsui Petroleum Chemical Industry Co., Ltd.) | |

Then, on each of the samples having formed the second protective layers by coating the coating compositions of Formulation II-1 to Formulation II-8 was further coated the solution of following Formulation III by means of a rotary coater at a rate of 135 r./min. to form a layer of behenic acid. The recording elements of this invention thus prepared using Formulation II-1 to Formulation II-8 are referred to Samples 1-8, respectively.

| Formulation III: | |
| --- | --- |
| n-Hexane | 1 liter |
| Behenic acid | 0.2 g |

On the other hand, as comparison samples, recording elements were prepared as in Samples 1–8 without the first protective layer. In this case, the thickness of the second protective layer was 10 μm. These samples are referred to as Comparison Samples 1–8.

Then, each of Sample A, Samples 1–8 of this invention, and Comparison Samples 1–8 was irradiated with a laser beam and the relative sensitivity of each recording element was measured. The laser light used was argon ion laser light of the maximum output of 2 watts and wave length of 5145 Å focused into a beam of about 13 μm in diameter by a lens and the recording element was scanned by the laser beam from the recording layer slide at a scanning speed of 100 meters/sec.

The sensitivity of each sample was relatively evaluated by comparing the minimum ouput stregnth of the laser required for clearly recording a record 10 μm width at the portions irradiated by the laser light without forming fog. That is, the lower minium output strength of the laser shows that the sensitivity is higher. The results are shown in Table 1.

TABLE 1

| Sample Example (sample No.) | Minimum Output Required (watt) | Comparison Sample Sample No. | Minimum Output Required (watt) |
| --- | --- | --- | --- |
| — | — | A | 0.575 |
| 1 | 1.0 | 1 | no record even at 2.0 |
| 2 | 1.0 | 2 | no record even at 2.0 |
| 3 | 1.0 | 3 | no record even at 2.0 |
| 4 | 1.0 | 4 | no record even at 2.0 |
| 5 | 1.0 | 5 | no record even at 2.0 |
| 6 | 1.0 | 6 | no record even at 2.0 |
| 7 | 1.0 | 7 | no record even at 2.0 |
| 8 | 1.0 | 8 | no record even at 2.0 |

As is clear from the results of the above table, it was confirmed that in the case of the samples of this invention, that is, having the protective layers of 10 μm, the minimum output strength of laser required for recording was not high or even twice that of Sample A having no protective layer. In other words, it was confirmed that when protective layers of 10 μm thick were formed in accordance with this invention, the recording sensitivity was not reduced below ½ under the aforesaid recording conditions. On the other hand, when a protective layer 10 μm was formed, the recording sensitivity was reduced to less than ⅓ as compared with Sample A having no protective layer.

Furthermore, for Sample A and Samples 1–8 of this invention, the mechanical strength under printing conditions was deterined by the following method. Using each of Sample A and Samples 1–8 of this invention having recorded information thereon as originals, continuous duplicates were formed by contact printing on Fuji diazo film M-type M-4208-P. In this case, Fuji Diazo Printer J-21 and Fuji Diazo Processor D-30 were used.

In sample A (no protective layer), when five duplicates were made, the original was damaged to the extent that much unreadable information was recorded. On the other hand, in the samples of this invention, the recording element were not damaged after 1,000 duplicates and the information recorded could be completely read. In addition, in comparison samples, the recording elements were not injured after making 1,000 duplicates. Thus, the samples of this invention had as high mechanical strength as those of the comparison.

EXAMPLE 9

The same procedure as in Examples 1–8 was followed except that chlorosulfonated polyethylene of following Formulation I-2 was coated at a dry thickness of 4 μm as the first protective layer in Example 9 and the sensitivity was measured by the same manner as in the examples. The result were the same as those in Examples 1–8.

| Formulation I-2: | |
| --- | --- |
| Chlorosulfonated polyethylene ("Highparon 30" made, by Showa Neoprene Co., Ltd.) | 6 g |
| Toluene | 100 ml |

While the invention has been described in detail and with reference to specific embodiments thereof, it will be apparent to one skilled in the art that various changes and modifications can be made therein without departing from the spirit and scope thereof.

What is claimed is:

1. A thermal recording element for recording information by thermally deforming a recording layer comprising a metal using a high intensity radiation and recording information by the change in the light transmitting and reflecting properties of the recording layer, comprising a support having formed thereon the recording layer, a first protective layer having a thickness of about 1 to 10 μm formed by coating a polymer having a softening point lower than about 70° C. on the recording layer, and a second protective layer having a thickness of about 1 to 10 μm formed by coating a polymer material having high mechanical strength on the first protective layer, said first protective layer minimizing decrease in sensitivity of the recording layer due to the second protective layer.

2. The thermal recording element of claim 1, wherein said support is polyethylene terephthalate.

3. The thermal recording element of claim 1, wherein said recording layer is a layer of Sn, Bi or In.

4. The thermal recording element of claim 1, wherein said recording layer is composed of a mixture of Sn, Bi or In and Ges, SnS or $PbI_2$ or composed of a layer of Sn, Bi or In and a layer of GeS, SnS or $PbI_2$.

5. The thermal recording element of claim 1, wherein the thickness of said recording layer is about 300 to 1,500 Å.

6. The thermal recording element of claim 1, wherein said polymer has a softening point of lower than 70° C. is an ethylene-vinyl acetate copolymer containing more than 10 wt. % vinyl acetate, or polychlorosulfonated polyethylene.

7. The thermal recording element of claim 1, wherein the polymer used for the second protective layer is a copolymer of vinyl chloride and vinyl acetate, polyvinyl chloride, acetyl cellulose, polyethylene terephthalate, polyimide, polyurethane, polyvinylidene fluoride, polyvinyl butyral, polyvinyl formal, polyvinyl alcohol, polyvinylidene chloride, polyethylene, polyvinyl pyrrolidone, polyvinyl acrylamide, nylon, polycarbonate, polypropylene, polystyrene, polybutene, polyethylene trifluorochloride, or poly(metha)acrylic acid ester.

8. The thermal recording element of claim 1, wherein said element has further an overcoat layer on the second protective layer.

9. The thermal recording element of claim 8, wherein said overcoat is composed of a higher fatty acid or a higher fatty acid amide.

10. The thermal recording element of claim 1, wherein the thickness of said first protective layer is 2 to 6 μm and the thickness of said second protective layer is 2 to 6 μm.

11. The thermal recording element of claim 10, wherein the combined thickness of said first and second protective layers is less than 10 μm.

12. The thermal recording element of claim 1, wherein said polymer used for the first protective layer is an ethylene-vinyl acetate copolymer containing more than 10 wt. % of vinyl acetate or polychlorosulfonated polyethylene, and said polymer used for the second protective layer is vinyl chloride-vinyl acetate copolymer, alcohol-soluble nylon, polyvinyl butyral, polyurethane, polyvinylidene choride, polyacrylate, ethyl cellulose or polyethylene.

* * * * *